United States Patent

[11] 3,630,357

[72] Inventor Arthur C. Nolte
 Cincinnati, Ohio
[21] Appl. No. 833,926
[22] Filed June 17, 1969
[45] Patented Dec. 28, 1971
[73] Assignee The Orville Simpson Company
 Cincinnati, Ohio
 Continuation-in-part of application Ser. No.
 724,482, Apr. 26, 1968, now abandoned.
 This application June 17, 1969, Ser. No.
 833,926

[54] STOP MOTION SCREENING APPARTUS AND METHOD
 13 Claims, 10 Drawing Figs.
[52] U.S. Cl. ..................................... 209/326,
 209/367, 74/61
[51] Int. Cl. ..................................... B07b 1/38
[50] Field of Search ........................... 209/325,
 326, 329, 305, 367, 415, 315, 368, 365 B, 360,
 311.5, 305 R, 365 A, 365 C; 74/26, 61; 73/71.6;
 259/DIG. 42

[56] References Cited
UNITED STATES PATENTS

| | | | |
|---|---|---|---|
| 2,062,529 | 3/1935 | Sabut ........................... | 209/326 |
| 2,088,313 | 7/1937 | Wettlaufer ................... | 209/326 X |
| 3,053,379 | 9/1962 | Roder ........................... | 209/367 X |
| 3,075,644 | 1/1963 | Ambrose ...................... | 209/415 X |
| 3,076,549 | 2/1963 | Becker ......................... | 209/367 |
| 1,675,560 | 7/1928 | Jubien .......................... | 209/72 UX |

FOREIGN PATENTS

| | | | |
|---|---|---|---|
| 95,980 | 6/1939 | Sweden ........................ | 74/61 |
| 1,000,207 | 11/1953 | France .......................... | 209/367 |

Primary Examiner—Frank W. Lutter
Assistant Examiner—Robert Halper
Attorney—Wood, Herron & Evans ABSTRACT: A method of screening to separate particulate materials into particle groups of different sizes or other characteristics. The screen is moved by a vibratory force which is of substantially constant frequency, but which has an amplitude that regularly and repetitively varies between a maximum and a minimum of essentially zero, so that the screen is momentarily stopped at periodic intervals several times a minute. The vibratory force is desirably a reaction force established by two closely spaced unbalances masses rotating in the same direction but at slightly different rates. The reaction force establishes a circular or elliptical motion, in the vertical plane, of points on the screen.

The apparatus includes a screen in a screen frame which supports a pair of closely spaced, centrally located shafts, each carrying an eccentric weight. Drive means rotate the eccentrics in the same direction of rotation but at rates that differ by about 1–15 percent. A beat results from the unequal rates of rotation. The beat has a frequency equal to the difference of the speeds of two rotating shafts, preferably 10–200 beats per minute. The faster rotating shaft should operate at a speed not greater than about 1,600 r.p.m.

PATENTED DEC 28 1971

INVENTOR.
Arthur C. Nolte
BY Wood, Herron & Evans
ATTORNEYS

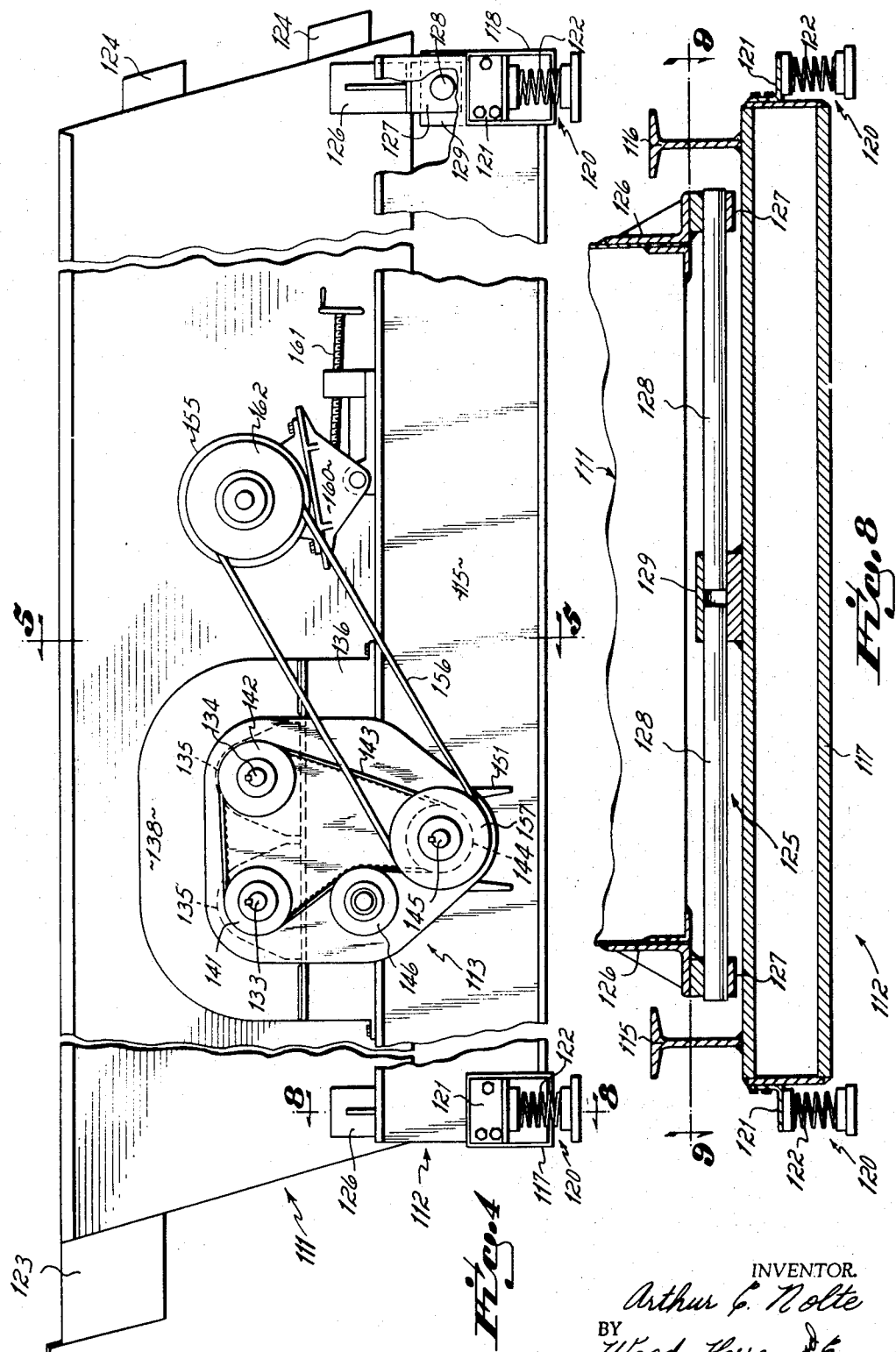

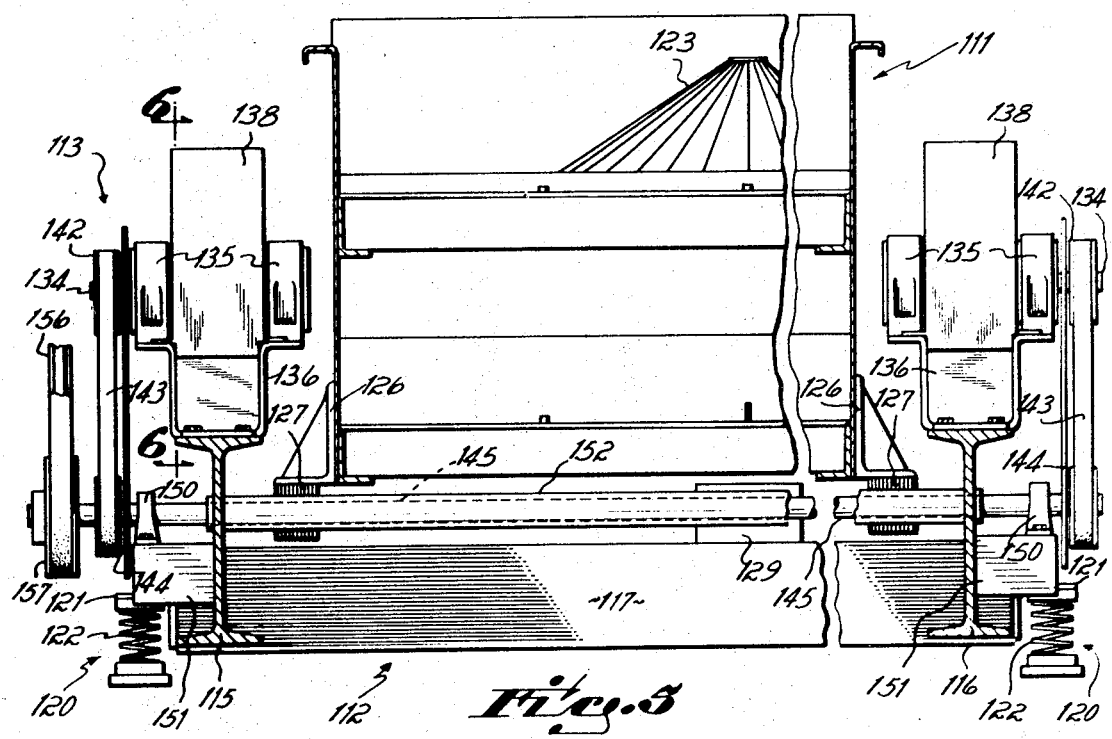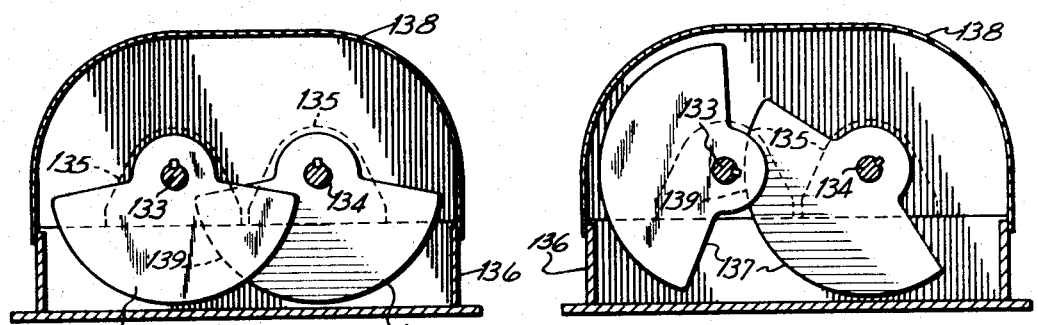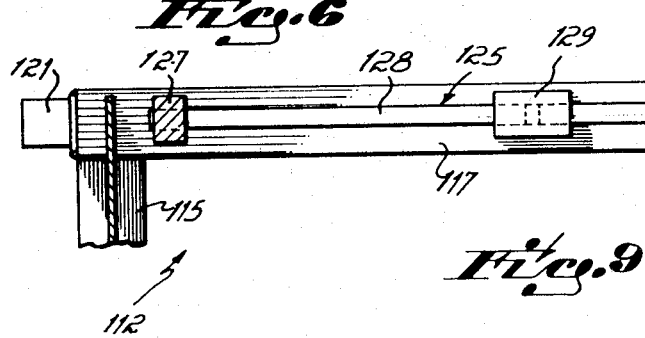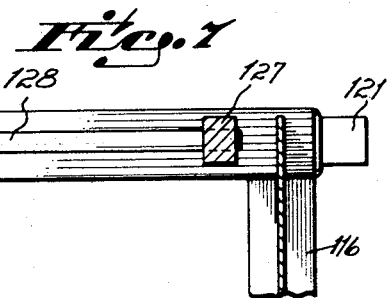

STOP MOTION SCREENING APPARTUS AND METHOD

This application is a continuation-in-part of my copending patent application, Ser. No. 724,482, filed Apr. 26, 1968, now abandoned.

This invention relates generally to the screening sifting, sorting or classifying of particulate materials, generally referred to hereinafter as screening. The invention is directed to a new method of vibrating screening apparatus to provide an especially high combined capacity and screening efficiency, in comparison to past screening methods.

In any typical screening system the screen is moved relative to the material on the screen surface, and the particles are vibrated so that particles which are smaller than the openings in the screen fall through the openings, while larger particles remain on the screen and are collected separately.

Screen-vibrating means usually include a rotating unbalanced mass which imparts a reaction force to the screen to move it relative to a base from which it is mounted. The vibrating mass has often been an eccentric mounted to a shaft, and in some cases plural shafts have been used. In such machines both the frequency and the amplitude of screen vibration is essentially constant once the machine is set in motion and is at stable operating conditions.

This invention is based in part on the discovery and determination that a higher combined efficiency and screening capacity can be obtained if the screen is driven by a vibratory force which is regularly and repetitively stopped a number of times each minute so that during that time, the screen is essentially motionless; that is, the amplitude of the vibrations imparted to the screen should vary cyclically and rapidly between a minimum of essentially zero, and a maximum.

Test results have shown that in comparison to conventional screening machines this method of screening establishes a higher total capacity and screening efficiency. (By "capacity" is meant the quantity of particulate material, in units per unit time, that can be separated into desired categories according to particle size, density, shape, etc. By "efficiency" is meant the ratio or percent of the amount of material of a given classification which is actually separated by the machine in unit time, as compared to the total amount of material of that classification that is contained in the particulate material being screened). There have previously been machines which have had good screening efficiency, or good screening capacity, but there is known to me no screening method or apparatus which enables both high efficiency and high capacity to be attained.

As explained hereinafter more fully, in the new method the vibratory force having the desired constant frequency varying amplitude characteristics can be established in a number of different ways. It has been found that especially useful vibratory structure for carrying out the new method comprises a pair of closely spaced, centrally positioned parallel shafts, each having an eccentric mounted to it, which shafts are rotated in the same direction but at slightly different rates: one eccentric is rotated at a rate slightly greater, about 1–15 percent greater than the rate of the other. The difference in rates of shaft vibration establishes a differential or beat frequency. I have found it important that this beat be in the range of about 10–200 beats per minute, depending upon the material being screened, the accuracy of separation required, and other factors.

It is important that the shafts be rotated in the same direction, rather than in opposite directions, in order for the advantages of the invention to be obtained.

When such unbalance masses are rotated about parallel axes at unequal rates of speed, they impart a reaction force to the screen, the net magnitude and direction of which constantly changes with the instantaneous locations of the unbalanced weights. When the force vectors of the two rotating masses both act in the same direction, they are additive and they impart a large vibratory force to the screen, corresponding to maximum amplitude of movement. As one shaft advances with respect to the other shaft, the relation of the vectors changes with respect to one another, and with respect to the screen frame. When the vectors point 180° away from one another, only a small resultant force will act on the screen, due to the small spacing of the weights and the difference in the rates of rotation of the shafts. The motion of the screen is then at a minimum amplitude. Thus the screen motion goes cyclically from a minimal vibration at which it is momentarily essentially motionless over its length, to a momentary maximum of vibration.

It is important that the paired eccentrics be closely spaced with respect to the longitudinal dimensions of the screen box and of the spring mounts thereof. In general, the closer the longitudinal spacing of the eccentrics, the more nearly will the screen box be momentarily "stopped" at the minimum point of the vibratory cycle.

In this connection, the spacing of the eccentric shafts (in the direction of material flow) should be less than substantially 0.25 of the spacing between the points at which the screen box is supported by its spring mounts, and the spacing of the shafts should be less than 0.13 of the longitudinal dimension of the screen surface. The eccentrics should, moreover, be located centrally of the screen, close to the center of mass thereof.

Where the spacing of the shafts substantially exceeds the ratios stated, the couple resulting from the rotation of the weights about the widely spaced shafts is so great that a rocking motion results such that even at the minimal mode of vibration the screen is moving abruptly at its ends and there is no "stop motion" effect over the length of the screen.

U.S. Pat. No. 2,062,529 discloses a screener in which eccentrics are rotated in either the same or opposite directions, about widely spaced shafts which are separated by about one-half the overall screen length. If the shafts are rotated in opposite directions, a relatively poor separation is effected; and if the shafts are rotated in the same direction, the couple caused by the torque is so great, by the reason of their wide spacing that the ends of the screen constantly rock or "teeter-totter"; the screen is never essentially motionless along its entire length, and the stop motion screening effect is not present.

This new method of screening is suitable for use both with "single-mass" systems and with "dual-mass" systems. In single-mass systems, the vibratory motion is imparted directly from the vibrating means to the screen frame or box on which it is mounted, the screen box being resiliently mounted by spring support means. In a dual-mass system, the vibratory motion is imparted to a first mass comprising the base of the machine and is transmitted through resilient means to the screen box or frame which comprises the second mass. In a dual-mass system the frequency of the input vibration (not the beat) desirably approximates the natural resonant frequency of the screen frame, but should be unequal to the natural resonant frequency of the base, so that the screen frame will have large amplitude vibrations and the base will vibrate with only a small motion. This helps to isolate the vibratory force from the building floor or other support structure on which the screening machine is mounted.

The invention can best be further described by reference to the accompanying drawings, in which:

FIG. 4 is a side elevation, partly broken away, of a screening machine of the dual-mass type, in accordance with the invention;

FIG. 5 is a cross-sectional view, partly broken away, taken along line 5–5 of FIG. 4;

FIG. 6 is a vertical section taken on line 6–6 of FIG. 5 and shows the unbalanced masses on the parallel shafts, in similar angular positions;

FIG. 7 is a section similar to FIG. 6 but shows the relative positions o f the eccentrics at a different time, when the faster rotating eccentric has moved through a larger angular distance than the slower rotating eccentric;

FIG. 8 is a vertical section taken on line 8-8 of FIG. 4;

FIG. 9 is a horizontal section taken on line 9-9 of FIG. 8 and shows the spring mounts for the base, and also shows the bar mounting whereby the screen frame is resiliently mounted to the base.

Figure 1:
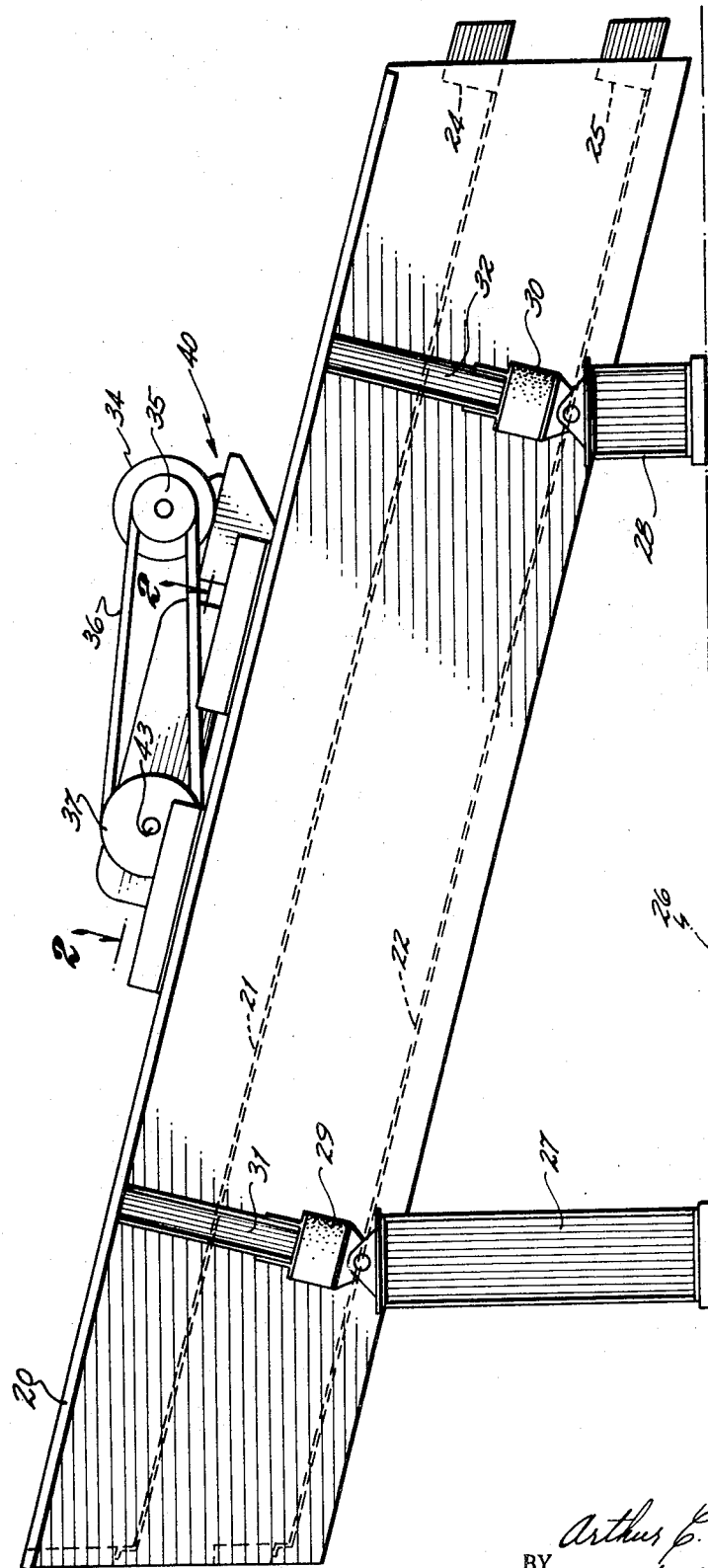
FIG. 1 is a side elevation of a preferred form of screening machine in accordance with the invention.
Figure 2:
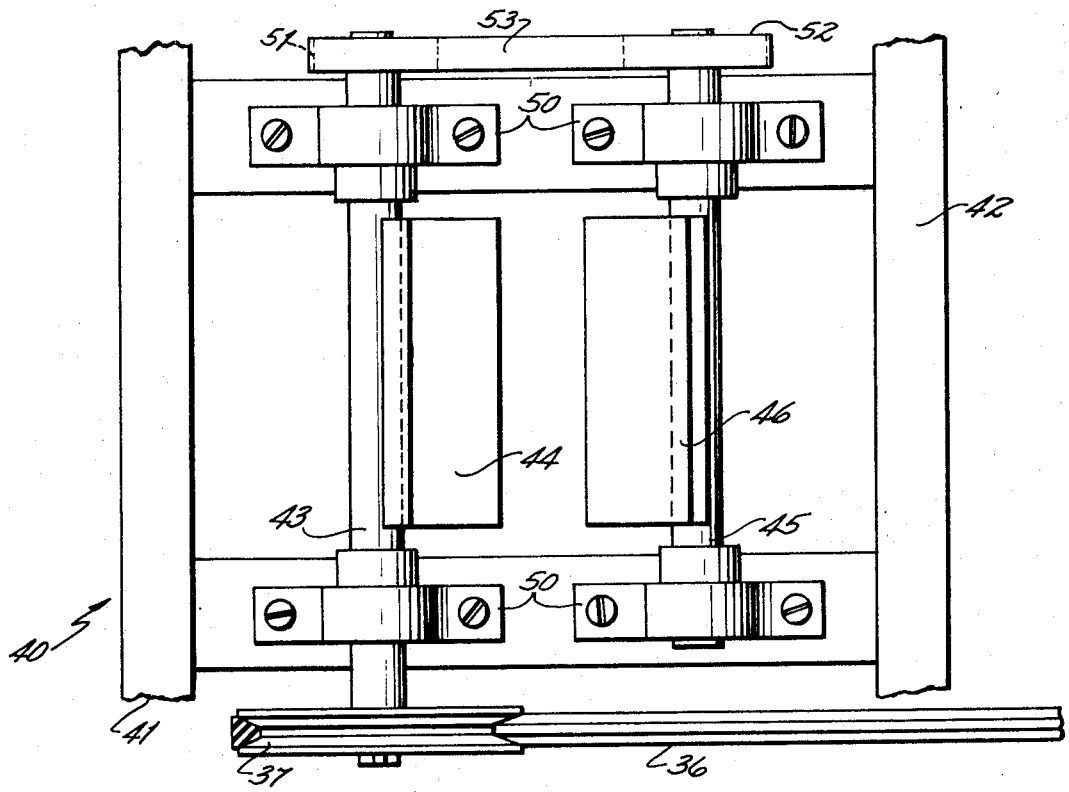
FIG. 2 is an enlarged transverse sectional view taken on line 2–2 of FIG. 1, showing the vibratory drive mechanism with the cover removed.
Figure 3:
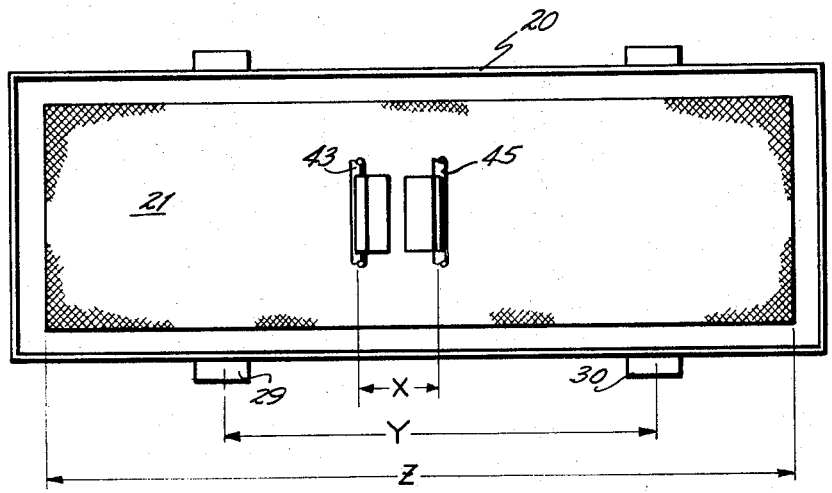
FIG. 3 is top plan, partly broken away, illustrating the spacing of the two vibratory masses in relation to the screen and spring mount dimensions.

With reference to the preferred form of the invention as shown in FIGS. 1-3, the screener includes a screen frame or box 20 which mounts two vertically spaced screens 21, 22, indicated by the dotted lines. Each screen is stretched across the box by suitable screen-tensioning means, not shown, which may be conventional. The axis of screen box 20 is angulated so that the screens are inclined at a suitable working angle which may, for example, between 1° and 25° with respect to horizontal. Screens 21 and 22 lead downwardly to collection chutes 24, 25 respectively which in turn lead to collecting means. It is understood that the material to be screened is discharged into the upper end of the top screen 21, and that fines pass through that screen to the second or lower screen 22 as they move downwardly along screen 21. Screen box 20 is supported above a fixed base or floor from channels or I-beams at 27, 28 through resilient mountings in the form of rubber blocks 29, 30 at upper ends of the channels. These resilient mounting means may be fastened to U-shaped channels 31 and 32 rigidly connected to the side of the screen box. The rubber blocks 29, 30 or other resilient spring-type mountings isolate vibration of the screen frame from the floor 26.

The drive means for vibrating the screen in accordance with this invention are indicated generally at 40 and are mounted to the top of the screen box 20 over the center of the screen, by crossbeams 41, 42 (see FIG. 2). The drive means 40 comprise a prime mover or electric motor 34 which operates a drive sheave 35 that is connected by a belt 36 to a driven sheave 37. The latter is connected to a shaft 43 which extends transversely of the screen frame. An eccentric mass 44, preferably of the shape shown in FIG. 2, is keyed to shaft 43 for rotation therewith, and this mass 44 constitutes one of the weights which operates to establish the vibration in accordance herewith. Shaft 43 and a second parallel shaft 45 are journaled as by pillow blocks shown at 50 on beams supported by the crossmembers 41, 42. Shaft 45 mounts an eccentric weight 46 similar to that already described at 44.

Shaft 43 has a drive pulley 51 at one end, which is of slightly smaller diameter than a driven pulley 52 mounted at the end of shaft 45 (see FIG. 2). Pulleys 51 and 52 are connected through a timing belt 53. Pulley 52 should be slightly larger than pulley 51 so that shaft 43 (which is closer to the higher end of the screen box 20) will rotate slightly faster than shaft 45.

With reference to FIG. 3, it will be seen that the axes of the two shafts 43, 45 are spaced longitudinally of the screen by a dimension which is indicated at X in the drawing. The center-to-center longitudinal spacing of the spring or resilient mounts 29, 30 is indicated as a dimension Y, while the overall length of the screen in the direction of material flow, i.e. the long axis of the screen, is indicated as a dimension Z. I found it to be important, to obtain a stop motion of the entire screen frame over its entire length, that the ratio of the dimension X to the dimension Y be not more than about 0.25, and that the ratio X/Z should be less than about 0.13. In the preferred embodiment shown, these ratios are X/Y=0.18 and X/Z=0.10. Moreover, the eccentrics are substantially centered both lengthwise and transversely of the screen.

The faster rotating shaft (shaft 43 in FIG. 2) should preferably be driven at a speed of 700-1,200 r.p.m. speeds faster than about 1,600 r.p.m. vibrate the screen with such rapidity that the benefits of the stop motion are mostly lost since the stoppage of motion is so brief that the particles do not have a chance to fall during the momentary stop period.

The difference between the speeds of the two shafts 43 and 45 should be in the range of about 1-15 percent for best results; especially good results have been obtained with a speed differential of 5 percent, with the faster shaft rotating at about 1,000-1,100 r.p.m. A beat of about one per second (50-60 per minute) works well for many materials. The manner in which the stop motion arises from the slightly different rates of rotation of these closely spaced shafts, rotating in the same direction, is described hereinafter.

The second embodiment of the invention, shown in FIGS. 4-9 of the drawings, in incorporated in a system of the "two-mass" type. That is, the screen frame (in which the screen is carried) is spring mounted to a base, which is in turn resiliently mounted to a floor or other support structure. The drive means for imparting the vibratory force to the screen frame is mounted to the base, rather than directly on the screen frame, and the vibrations are transmitted through the base to the screen.

The screen frame of screen box 111 internally mounts one or more screens (not shown), and a supporting base 112 to which the screen frame 111 is elastically mounted by means to be described, has drive means 113 mounted on it for establishing the vibratory force.

The base 112 incorporates two spaced I-beams 115 and 116 as its principal longitudinal frame members. These beams 115, 116 are transversely interconnected at their ends by rectangular or box beams 117 and 118, each I-beam being notched at each end to overlap the box beams which are secured to it.

At each of the four corners of base 112 a spring mounting 120 is attached for resiliently supporting the screening machine above underlying fixed structure such as a building floor not shown. Each spring mounting 120 includes an angle bracket 121 bolted to the end of the box beam 117 or 118, and a coil spring 122 which acts in compression to resiliently isolate the machine from the building in which it is operated.

The screen frame 111 is mounted above the base 112, and is shown in transverse section in FIG. 5. Frame 111 may be generally rectangular, being defined by longitudinal and transverse members, and it may include one or more screen cleaners, for example of the ball type, and particle discharging and collecting equipment. These components of the system may be conventional, for example as shown in U.S. Pat. No. 2,946,440, and have not been described in detail herein. Material is discharged from chute 123 at the left upper end of the machine as seen in FIG. 4, and after separation into classes, the particles are collected via chutes 124, from the right end of the machine.

The screen frame 111 is preferably mounted to base 112 by elastic means in the form of beam springs or bars rather than by coil springs. This structure is best shown in FIGS. 4, 8 and 9.

The resilient mounting means for the screen frame are designated generally by 125 and are connected to the screen frame adjacent the corners thereof, through angle brackets 126 secured to the screen frame. A split block 127 is mounted beneath each angle bracket 126 and rigidly mounts the outer end of a spring rod 128, preferably a round rod, which extends transversely to the screen frame, just above the respective box beam 117 and 118 of the base. The opposed inner ends of the pair of spring rods 128 at each end of the frame 111 are gripped in a split block 129 which is centrally mounted on the upper surface of the base box beams 117 and 118 (see FIGS. 8 and 9). Thus, the weight of the screen frame 111 is transmitted through the angle brackets 126 to the split blocks 127 and to the spring bars 128, transversely to the central split block 129, from which the load is in turn transmitted through the box beams 117 and 118 to the base spring mounts 120.

These resilient mounting means for the screen frame 111 permit the screen and screen frame (with the material load on the screen) to respond at approximately their natural resonant frequency to input vibrations, while at the same time they isolate the screen frame from the base which has a different natural resonant frequency. Leaf springs are not ineffective for this purpose, purpose, but the round bars shown are especially advantageous because they reflect the vibrations symmetrically to permit vibration of the screen frame in a circular path, whereas leaf springs do not, and the bars have been found to be efficient and compact for that purpose. Coil springs are alternatively feasible.

The drive means 113, or vibratory source, are mounted to the base 112 on the I-beam 115 at one side thereof. These means 113 include two longitudinally spaced, driven shafts 133 and 134 having axes which are transverse to the longitudinal axis of the screen frame.

The shafts 133 and 134 are supported and journaled for rotation in separate bearing blocks 135 and carried by a U-shaped channel 136 (see FIG. 2) secured to the top flange of the I-beam 115. An unbalanced mass 137 in the form of an eccentric weight is keyed to each shaft 133 and 134. The two weights may be identical in size and shape, and are housed for rotation in a protective sheet metal cover 138.

In this embodiment the longitudinal spacing X between shafts 133 and 134 is about 0.07 of the overall length Z of the screen frame. To minimize shaft spacing it is convenient that the weights be axially offset from one set from one another on their shafts so that they are overlapped, as indicated by the dotted line at 139 in FIG. 6. In place of the single weight shown on each shaft, multiple weights are also feasible.

Shaft 133 is keyed to a drive pulley 141 and shaft 134 to a drive pulley 142 which is somewhat larger in diameter than pulley 141, so that shaft 133 is driven slightly faster than shaft 134. The speed of shaft 133 is suitably about 1,050 r.p.m. with shaft 134 rotating at about 1,000 r.p.m.

Pulleys 141 and 142 may be gear pulleys driving by a timing belt 143 from a drive pulley 144 keyed to a shaft 145. AN idler pulley 146 maintains belt tension. Shaft 145 extends transversely to the base 112, parallel to but below shaft 133 and 134, transversely beneath the screen frame 111. Shaft 145 is journaled adjacent its ends in blocks 150 mounted to brackets 151 and projecting from the I-beams 115 and 116 respectively (see FIG. 5).

The shaft 145 is housed in a tubular sleeve 152 which projects through openings in I-beam 115 and 116 beneath the screen frame. This sleeve 152 functions more in the manner of a protective cover than as a journal. The shaft is rotated by an electric motor 155 through a belt 156 which drives a speed reduction pulley 157 keyed to shaft 145. As shown in FIG. 4, motor 155 is mounted to I-beam 155 on an adjustably positionable bracket 160. The angulation of bracket 160 can be changed by a hand screw 161. Motor 155 has a variable pulley 162 so that the rate at which shaft 145 is driven can be changed to optimize results. This feature is desirable where the operating parameters such as loading will vary, so that the frequency of the input vibrations can be varied to obtain the optimum rate for the particular conditions, but it is not a necessary feature.

In order that the machine may be a more balanced or symmetrical structure with equal vibratory reactions on each side of the screen frame 11, a similar second set of drive shafts and unbalanced masses is mounted on the other or opposite side of the screen frame as shown in FIG. 5. Use of timing belts 43 to drive the masses on opposite sides of the machine is desirable because this maintains synchronism between corresponding opposite masses.

Power is supplied to both sets of eccentrics through shaft 145, from motor 155. The shafts are all driven in the same direction of rotation, and at the same speed differential.

For a given machine of the type shown in FIGS. 4–9, the spring mount 125, the mass of the base 112, and the mass of screen frame 111 (plus the average load on it) and the rate of rotation of shaft 145 should be so interrelated so that the frame 111 is vibrated at approximately its resonant frequency, but the base is not. In this manner, the amplitude of base movement will be small, but the peak amplitude of screen movement will be great. This establishes a minimum of transmission of vibrations through the base-mounting springs 120, and makes it feasible to mount the heavy drive means 113 on the base rather than on the frame 111.

Referring to both the embodiment of FIGS. 1–3 and the embodiment of FIGS. 4–9, by reason of the slightly faster rate of rotation of the upstream shaft in relation to the downstream shaft in each case, the eccentric of the upstream shaft will advance in comparison to the other eccentric (compare FIGS. 6 and 7).

When the weights on the respective shafts are 180° apart, their net reaction force is essentially zero. (It is not precisely zero by reason of the fact that one shaft is going slightly faster than the other, and the term "essentially zero" as used herein is meant to include this small difference). Under these circumstances, the reacting force acting on the screen is minimal, and the amplitude of screen movement is momentarily almost nil, so that for practical purposes the screen comes briefly to a stop. When the shafts are at the same angular positions (as in FIG. 6) then the force vectors are additive, and the amplitude of screen vibration is at a maximum. Thus the individual frequencies of the two shafts—and the frequency of the resulting vibratory force—remain substantially constant, neglecting minor variants such as screen-loading charges, line voltage fluctuation, and belt slippage, because the rates of shaft rotation are substantially constant; but the amplitude or the reaction force varies from a minimum, to a maximum. Analysis demonstrates that the variation or envelope of an amplitude trace is essentially sinusoidal.

Figure 10:
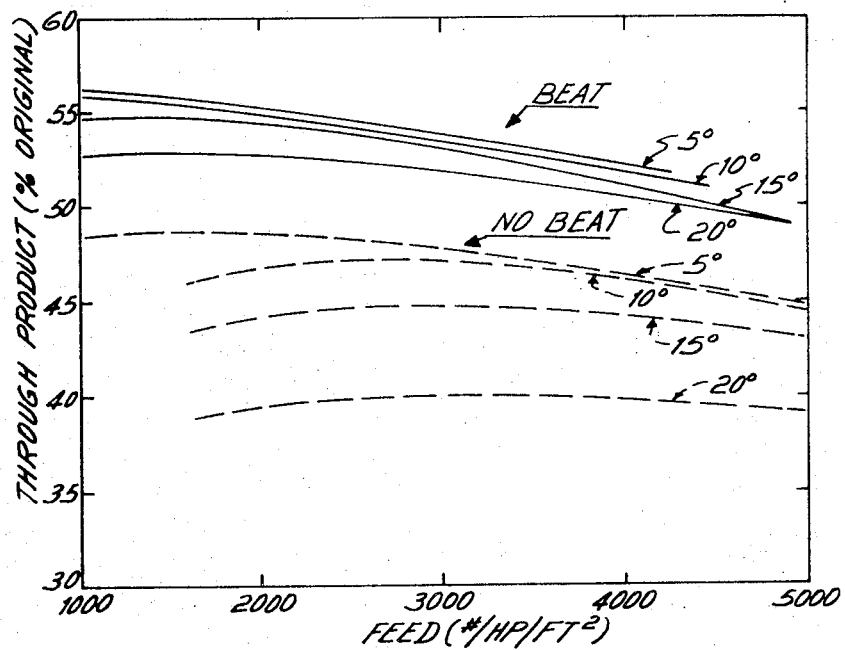
FIG. 10 is a graph comparing the screening results obtained by the method of this invention, with results obtained by screening the same material without a beat.

Test work has demonstrated the significance of the beat in terms of screening results, as compared with the results obtained if both shafts are rotating in the same direction and at the same rate (that is, without a beat). FIG. 10 shows the throughput of material as a function of feed rate, for the two conditions, and at different screen angulations. The upper series of four curves represents results obtained with the machine described above at 5°, 10°, 15°, and 20° screen angulations. In those runs the machine was operated with a beat in accordance with this invention. The lower series of four curves represents results obtained at 5°, 10°, 15°, and of angulation of the same machine but operated with both shafts rotating in the same direction and at the same rate of speed, and with no beat. At each screen angulation the results obtained by use of the invention were significantly better than those obtained without the beat; moreover, the results obtained with the new machine under the most severe conditions of screen angulation (20°) were far superior to those obtained at the least screen angulation of the comparison runs with a beat.

The actual screening efficiency obtained will of course vary with the size and nature of the material being screened, frequency, frequency differential, amplitude, and so on, but can be optimized by a series of standard tests. However, in general, the percentage of through product is not highly dependent on pulse time or beat frequency; for example, the results obtained in one test at one beat per second were not a great deal different from those obtained at a beat frequency of two per second, although there was a slight difference. Generally speaking, the rate of shaft rotation is a greater determinant of the percentage of product through the screen in unit time, and a difference of 200 r.p.m. in the speed of shaft 45 can make a difference of perhaps 2 percent in throughput per unit time.

The marked screening improvement in accordance with this invention is obtained by using a beat or difference in the rates of speed between closely spaced shafts rotating in the same direction. If the two shafts 133 and 134 were rotated in opposite directions, with a speed differential, I have found that there is a pronounced tendency for the screen to "blind," that is, the screen holes tend to plug. This condition is of course undesirable. Where the X/Y ratio substantially exceeds 0.25 or the X/Z ratio substantially exceeds 0.13, there is no stop motion of the entire screen, and the effect is absent or poor.

With reference to FIGS. 1 and 4, the direction of material conveyance on the machines shown is generally from the left to the right. The material is deposited on the top screen at the left end of the screen frame, and it is conveyed generally toward the right and is discharged or collected toward the right end of the screen frame. I have found it to be preferable in ordinary circumstances that the faster rotating shaft be in the upstream direction.

Tests demonstrate that points at the ends of the screen move in inwardly pointing ellipses. The result of this is that material tends to be conveyed toward the center of the screen from the charging end.

It should be understood that while I presently prefer to carry out the new method of the invention with the apparatus shown, I believe the new method is widely applicable and may be practiced with equipment other than that illustrated. From the description herein, those skilled in the art will appreciate that other types of vibrating machinery suitable for the practice of the new method, can be envisioned in addition to the dual parallel rotating shaft mechanism illustrated. Electromagnetic vibrating apparatus, operated at a constant frequency but at varying amplitude so as to establish a beat, is contemplated.

It is my theory that the marked improvement demonstrated by use of a beat comes from the fact that during the moment when the screen is essentially stopped, particles fall through the screen that for some reason would not otherwise pass it. This can be demonstrated with a hand-held screen by noting the relatively large amount of fines which fall through the screen when shaking is stopped.

While I have described hereinabove a preferred form of the invention, the invention is not limited thereto but can be embodied in other structures and methods within the scope and spirit of the claims which follow.

I claim:

1. In the screening of particulate material to separate particles of different characteristics, the method which comprises, applying a vibratory force to a screen on which said material is disposed, while resiliently supporting the screen at at least two spaced points, said vibratory force moving points on said screen in circular paths in plane perpendicular to said screen, said vibratory force being applied centrally of said screen, close to the center of mass thereof said vibratory force being applied to said screen at locations which are spaced longitudinally, the longitudinal spacing being no more than about 0.13 the length of the screen and not more than about 0.25 the longitudinal distance between the screen supports, maintaining the frequency of said vibrating force at a substantially constant rate less than about 1,600 cycles per minute, while repetitively and regularly varying the amplitude of said vibratory force from a minimum of essentially zero to a maximum, so that said screen is momentarily essentially stopped over its entire length at periodic intervals.

2. The method of claim 1 wherein the amplitude of said vibratory force is reduced essentially to zero between about 10 and 200 times per minute.

3. The method of claim 1 wherein the envelope of the amplitude of said vibratory force follows a sinusoidal path between its minimum and maximum amplitudes.

4. The method of claim 1 wherein said vibratory force is applied to said screen along a line approximately equally spaced from each end thereof.

5. In the screening of particulate material to separate particles of different characteristics, the method which comprises, applying a vibratory force to a screen on which said material is disposed, while resiliently supporting the screen at least two spaced points, said vibratory force being applied to said screen at locations which are spaced longitudinally by no more than about 0.13 the length of the screen and by no more than about 0.25 the longitudinal distance between the screen supports, said vibratory force moving points on said screen in circular paths in planes perpendicular to said screen and being a reaction force which is the resultant of unbalanced masses rotating in the same direction but at different rates about parallel transverse axes at said locations, maintaining the frequency of said vibrating force at a substantially constant rate less than about 1,600 cycles per minute, while repetitively and regularly varying the amplitude of said vibratory force from a minimum of essentially zero to a maximum, so that said screen is momentarily essentially stopped over its entire length at periodic intervals.

6. Screening apparatus comprising, a screen frame mounting a screen;

at least two longitudinally spaced resilient means supporting said screen frame;

and a vibratory drive connected for vibrating said screen frame;

said vibratory drive comprising, a pair of spaced parallel shafts and means journaling said shafts for rotation, said shafts being spaced by not more than about 0.13 the length of said screen and not more than about 0.25 the longitudinal distance between said resilient means;

an unbalanced weight on each said shaft, and drive means connected to drive said shafts and weights thereon in the same direction of rotation at substantially constant but different rates so that one shaft rotates at a rate which is greater than the rate of rotation of other shaft, said drive means operating the faster rotating shaft at a rate less than about 1,600 r.p.m.

7. The screening apparatus of claim 6 wherein said shafts are both driven by single drive means and are interconnected by a drivebelt so that their rotations are mechanically interrelated.

8. The screening apparatus of claim 7 wherein said drive means comprises a motor which drives both shafts through a belt, and wherein said shafts have drive pulleys of different diameters.

9. The screening apparatus of claim 6 wherein the faster rotating shaft is in the upstream direction of material flow on said screen, from the slower rotating shaft.

10. The screening apparatus of claim 6 wherein said drive means drives one shaft at a rate which is between about 1 and 15 percent faster than the other shaft is driven.

11. The screening apparatus of claim 10 wherein the rate differential is about 5 percent.

12. The screening apparatus of claim 6 wherein the difference in the rates of rotation is between 10 and 200 r.p.m.

13. The screening apparatus of claim 12 wherein the difference is about 50–60 r.p.m.

* * * * *